United States Patent [19]
Manetta et al.

[11] Patent Number: 5,774,971
[45] Date of Patent: Jul. 7, 1998

[54] METHOD OF MANUFACTURING STANDARDIZED PIN-BASED PARTS

[76] Inventors: Peter J. Manetta, 12477 Evergreen, Shelby Township, Mich. 48315; Lawrence A. Schueneman, 32480 Sutton, New Baltimore, Mich. 48047

[21] Appl. No.: 770,946

[22] Filed: Dec. 31, 1996

[51] Int. Cl.⁶ .................................................. B23P 25/00
[52] U.S. Cl. ............................. 29/458; 29/525; 29/558
[58] Field of Search ....................... 29/456, 458, 525, 29/527.2, 527.4, 557, 558

[56] References Cited

U.S. PATENT DOCUMENTS

| | | | |
|---|---|---|---|
| 2,897,805 | 8/1959 | Etzler | 29/525 |
| 4,205,423 | 6/1980 | Poole et al. | 29/458 |
| 4,794,894 | 1/1989 | Gill | 29/525 |
| 4,901,426 | 2/1990 | Laue | 29/525 |
| 5,185,923 | 2/1993 | Taniguchi et al. | 29/525 |
| 5,309,620 | 5/1994 | Shinohara et al. | 29/525 |

*Primary Examiner*—David P. Bryant
*Attorney, Agent, or Firm*—John R. Benefiel

[57] ABSTRACT

A method of manufacturing a wide assortment of parts at least some having hardened and ground pin sections of various lengths and diameters, and various end features such as heads, keeper slots, cotter pin holes, snap ring grooves, flats, etc. in which an inventory of pin blanks of long lengths and various diameters is manufactured as well as separate end caps of various end feature configurations, sizes and spacings. By cutting off the pin blanks to a desired length and assembling a proper end cap to the cutoff pin, a pin part can be quickly manufactured.

7 Claims, 3 Drawing Sheets

METHOD OF MANUFACTURING STANDARDIZED PIN-BASED PARTS

BACKGROUND OF THE INVENTION

This invention concerns the manufacture of parts having pin sections.

In the manufacture of equipment such as machine tools, conveyors, etc., numerous small parts are required, many of which involve a hardened and ground pin section such as to be capable of resisting wear from rotary motion when in service. The pin sections may also sometimes be unhardened or only moderately hardened depending on the application. Many of such parts have end features such as heads, hex headed shoulder screws, antirotation flats, cotter pin holes, grooves for keepers or snap rings, etc., these end features of various sizes and locations.

In an effort to cut costs and improve efficiency, manufacturers of such equipment often purchase such details from specialty companies which manufacture a large number of standardized versions of pin based parts.

However, there is such a great number of sizes and types of standardized versions of such parts, particularly the large number of different lengths of the pin sections when combined with the number of feature types and their size and location that it is impractical to keep them in stock ready for delivery.

On the other hand, if it is necessary to heat treat the pin sections after machining to harden them and then to grind the pin to a finished size, this means that a substantial time period will often be needed to manufacture the parts to an order.

Another factor increasing the cost to manufacture such details is that many of these parts have larger diameter heads which prevent centerless grinding of the part, requiring use of a more expensive grinding process.

It is the object of the present invention to provide an economical method of manufacturing a wide assortment of standardized pin-based parts with a variety of variously configured and located end features.

It is another object of the present invention to provide a method of manufacturing such pin-based parts having hardened ground pin sections which allow rapid production and delivery to an order, and which reduces the cost of manufacture of such parts.

SUMMARY OF THE INVENTION

The above-recited objects are achieved by a manufacturing method including the steps of manufacturing long lengths of pin blanks of the various diameters required.

Some of the pin blanks may be hardened and precision ground as needed for each of the diameters required to establish a complete inventory.

A stock of an assortment of end caps corresponding to end features for each configuration and location is separately manufactured.

In order to manufacture a specified pin parts, pin sections are cut from the appropriate diameter of hardened, moderately hardened, or unhardened pin blanks stock to the lengths required. The appropriate end caps are selected from the inventory and each mounted to an end of the cut pin blanks. Preferably the mounting of the end caps is by inserting a reduced plug portion of the end cap into a bore in the end of the pin having a slight interference fit with the plug. A seizing compound causes the mating parts to be firmly secured together.

Any of a great number of pin detail parts can be quickly made at low cost from premanufactured stock.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

According to the concept of the present invention, an inventory of pin blanks is manufactured, each blank of at least the longest lengths of each diameter of the pin portion of each pin based detail to be made. For example, if the maximum pin portion is up to six inches and functional diameters up to 1¼ inches are to be made, the pin stock inventory would consist of six inch lengths of 0.250, 0.312, 0.375, 0.438, 0.500, 0.750, 0.875, 1.000, and 1.250 inch diameter pins. Multiples of these lengths could also be inventoried.

At least a portion of the inventory would be hardened and ground to size.

Separately manufactured is an assortment of end caps for providing each end feature of every size, location, and configuration necessary to produce the desired pin based part when assembled to a particular length of pin blank.

The end caps would not necessarily have to be inventoried since they would not need to be heat treated and ground, but this inventorying would be preferred to maximize the speed of completing a request for a particular assortment of pin based parts. These end caps would typically provide heads, snap ring slots, keeper grooves, antirotation flats, cotter pin holes, bolt heads for shoulder screws, knurled sections, threaded studs, and the like.

The end cap formed with a stud sized to be pressed into a corresponding bore machined axially into a respective end face of a pin blank cut to length from a pin blank from inventoried stock.

The stud is preferably secured in place with a compound which promotes a seizing in the bore to securely hold the end cap in place throughout its service life.

Alternatively, the stud can be formed with an interference fit thread engaging a threaded bore in the pin stock cutoff.

Figure 1:
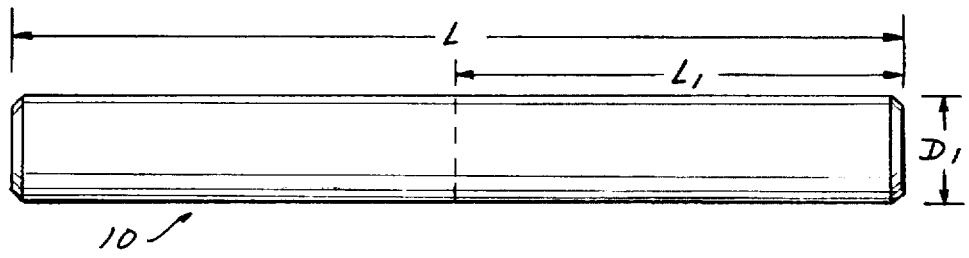
FIG. 1 is a side elevational view of a premanufactured long length item of pin stock.
Figure 2:
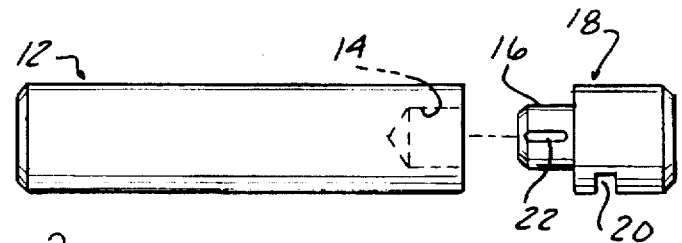
FIG. 2 is an exploded side view of a cutoff section of pin blank stock and end cap to be assembled thereto.
Figure 3:
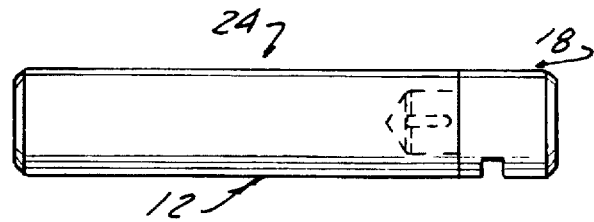
FIG. 3 is a side view of the completed pin-based part.

FIG. 1 shows a typical long length hardened and ground pin stock blank 10 of a standard length L and a particular diameter $D_1$, chamfered on either end. The pin blank item 10 is cutoff to a desired length $L_1$ to form a pin section 12 (FIG. 2) chamfered on one end as shown.

An axial bore 14 is machined into the opposite end sized to provide a light interference fit with a plug 16 on a selected end cap 18 having the required end feature, here shown as a keeper slot 20. A flat 22 can be formed on the stud 16 to allow air to escape when the plug 16 is advanced into the bore 14. A small venting hole 22A drilled in through the cap 18 can also be employed.

The plug 16 is preferably coated with TRIB-GEL, a material available from Ball Burnishing Machine Tools, Ltd., 12 Brookmans Avenue, Brookmans Park, Hartfield Herts AL97QJ, United Kingdom.

This material causes seizing of the interfit plug 16 and bore 14 when assembled with a light interference fit. This seizing is capable of resisting pull forces on the order of one ton, which is more than adequate for the applications contemplated.

Thus, a completed pin based part 24 is provided by the permanent assembly of the cutoff pin segment 12 and end cap 18.

Figure 4:
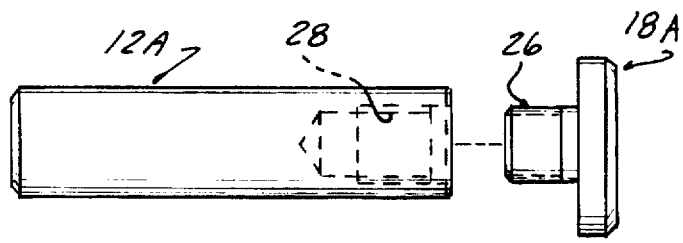
FIG. 4 is an exploded view of a cutoff section of a pin blank and end cap of a different configuration to be mounted together by an alternate method.
Figure 5:
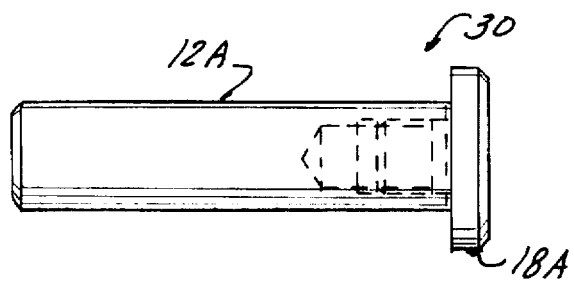
FIG. 5 is a side elevational view of the pin-based part assembled from the pin blank section and end cap shown in FIG. 4.

Alternatively, as shown in FIGS. 4 and 5, the end cap 18A, which here provides a head feature, can be formed with a threaded stud 26 which is advanced into a bore 28 in a pin segment 12A formed with a mating class 5 external interference fit thread to be secured thereto. A LOCTITE™ compound can also be applied to secure the connection. A completed headed pin part 30 is thus constructed.

FIGS. 6–29 illustrate an assortment of the various types of typical pin detail parts which would be manufactured in this manner, all using a common inventoried stock of hardened and ground pin lengths of various diameters.

Figure 6:
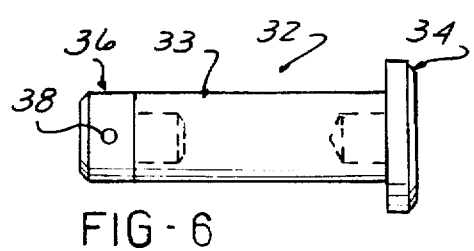
FIG. 6 is a side elevational view of another pin-based part manufactured by the method of the present invention having end caps each of a different configuration mounted to either end of a cutoff section of a pin blank.

FIG. 6 shows a headed pin 32, having a first end cap 34 providing the head feature and a second end cap 36 providing a cotter pin hole 38. By using a separate end cap 34 to provide the head, machining a stress relief U cut groove at the corner formed by the pin 33 can be eliminated, as no stress concentration is created when a separate piece is used. A variety of sizes and feature locations must be provided by a respective end cap.

End cap 36, as well as others described herein are preferably black oxide treated to deter rusting and provide a better appearance.

Figure 7:
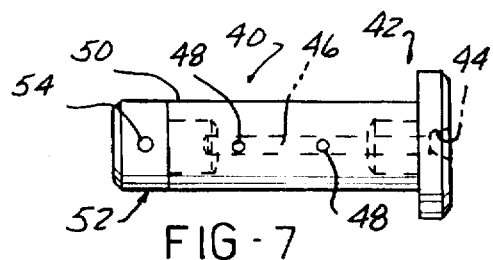
FIG. 7 is a side elevational view of a headed pin-based part manufactured by the method of the present invention with lube fitting and cotter pin hole features on respective end caps.

FIG. 7 shows a headed pin 40 having an end cap 42 providing a threaded hole 44 lube fitting to supply control passage 46 communicating with lube holes 48 in pin cutoff 50.

A second end cap 52 with a cotter pin opening 54 is also provided as in the previously described example.

Figure 8:
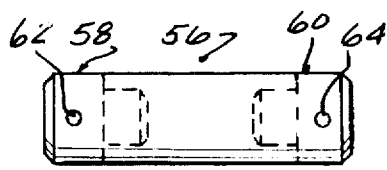
FIG. 8 is a side elevational view of a pin-based part manufactured by the method of the present invention having cotter pin holes in each of two end caps.

FIG. 8 shows another pin detail part 56 having opposite end caps 58, 60 each providing a cotter pin hole 62, 64.

Figure 9:
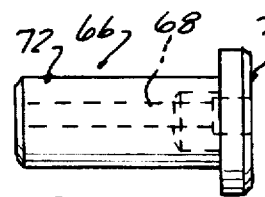
FIG. 9 is a side elevational view of a pin-based part comprising a headed stub pin.

FIG. 9 shows a "stub" pin 66 in which an eccentrically located socket screw 68 is received in a threaded hole tapped and drilled axially into a head 20 and pin body 72.

Figure 10:
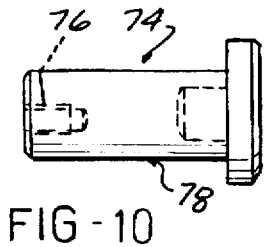
FIG. 10 is a side elevational view of a pin-based part manufactured by the method of the present invention of a different type.

FIG. 10 illustrates another type of stub pin 74 with an eccentrically located hole 76 drilled and tapped axially into the opposite end of the pin 76.

Figure 11:
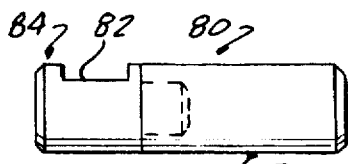
FIG. 11 is a side elevational view of a pin-based part which comprises a pin with a single flat.

FIG. 11 depicts a single flat pin 80 in which an end cap 84 has a flat 82 machined thereinto, attached to a pin body 84.

Figure 12:
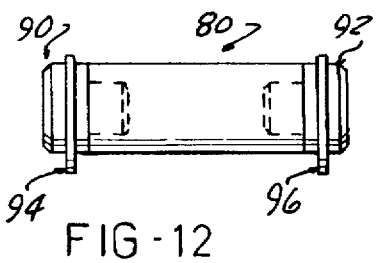
FIG. 12 is a side elevational view of a pin-based part which comprises a pin with a double snap ring.

FIG. 12 shows a double snap ring pin 88, in which end caps 90, 92 are each grooved to received a snap ring 94, 96.

Figure 13:
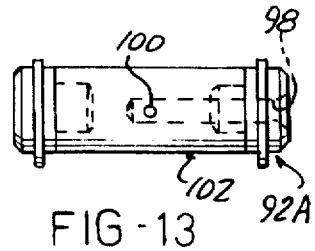
FIG. 13 is a side elevational view of a pin-based part which comprises a pin with a double snap ring and a lube fitting.

FIG. 13 shows a similar pin with a lube fitting seat 98 machined into end cap 92A and a lube hole 100 machined into pin body 102.

Figure 14:
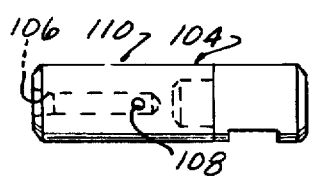
FIG. 14 is a side elevational view of a pin-based part which comprises a pin with a single flat and a lube fitting.

FIG. 14 shows a single flat pin 104 having lube fitting socket 106 and lube hole 108 both machined into the pin body 110.

Figure 15:
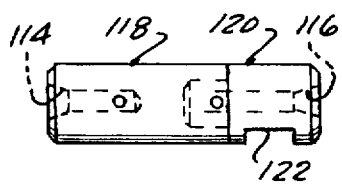
FIG. 15 is a side elevational view of a pin-based part with a single flat and a double lube fitting.

FIG. 15 is similar but with a pair of lube fitting sockets 112, 114, one machined into pin body 118 and the other end 116 into end cap 120 formed with flat 122.

Figure 16:
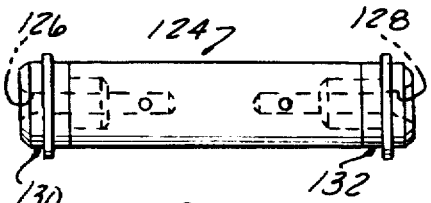
FIG. 16 is a side elevational view of a pin-based part which comprises a pin with a double snap ring and lube fitting.

FIG. 16 shows a longer length double snap ring pin 124, in which lube fitting sockets 126, 128 are machined into respective end caps 130, 132.

Figure 17:
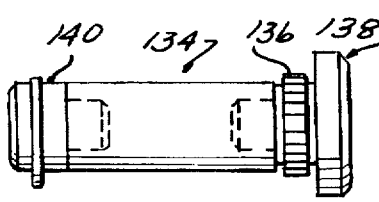
FIG. 17 is a side elevational view of a pin-based part which comprises a headed pin with a knurl section and a snap ring.

FIG. 17 illustrates a headed pin 134 with a knurled section 136 formed on headed end cap 138, and a snap ring recess on an opposite end cap 140.

Figure 18:
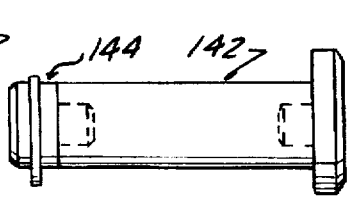
FIG. 18 is a side elevational view of a pin-based part which comprises a simple headed pin with a snap ring.

FIG. 18 shows a headed pin 142 with a snap ring recess on an opposite end cap 144.

Figure 19:
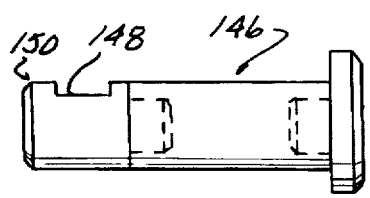
FIG. 19 is a side elevational view of a pin-based part which comprises a headed pin with a single flat.

In FIG. 19, a headed pin 146 has a single flat 148 on an opposite end cap 150.

Figure 20:
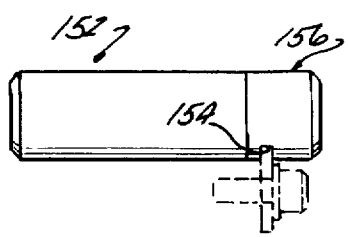
FIG. 20 is a side elevational view of a pin-based part which comprises a pin with a single keeper.

In FIG. 20, pin 152 has a keeper slot 154 formed in end cap 156.

Figure 21:
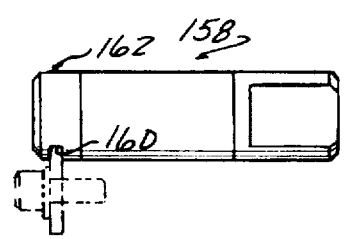
FIG. 21 is a side elevational view of a pin-based part which comprises an antirotation pin with a keeper.

In FIG. 21, single flat pin 158 has a keeper slot 160 in end cap 162.

Figure 22:
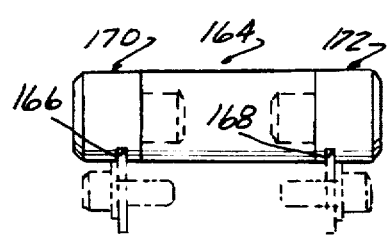
FIG. 22 is a side elevational view of a pin-based part which comprises a pin with a double keeper.

FIG. 22 shows a spin 164 with keeper slots 166, 168 in respective end caps 170, 172 in each end.

Figure 23:
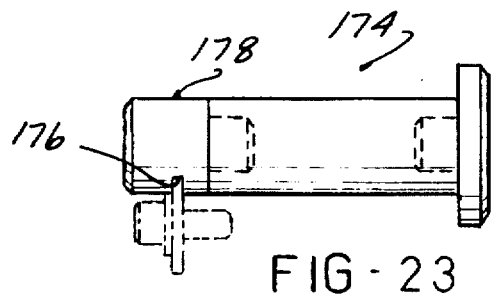
FIG. 23 is a side elevational view of a pin-based part which comprises a headed pin with a single keeper.

FIG. 23 shows a headed pin 174 with a keeper slot 176 in an end cap 178.

Figure 24:
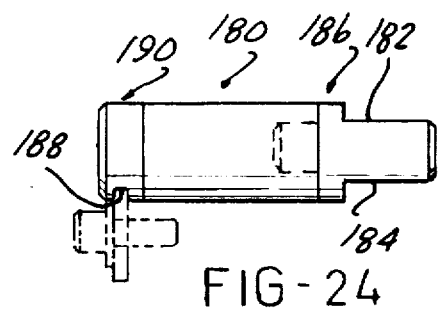
FIG. 24 is a side elevational view of a pin-based part which comprises an antirotation pin with a single keeper.

FIG. 24 illustrates an antirotation pin 180, with two flats 182, 184 on one end cap 186, and a keeper slot 188 on the other end cap 190.

Figure 25:
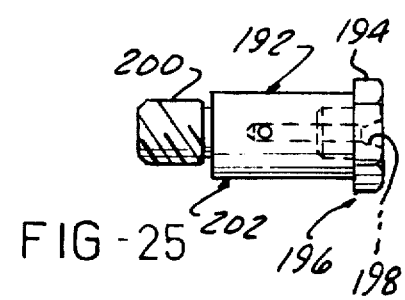
FIG. 25 is a side elevational view of a pin-based part which comprises a short length shoulder screw with a lube fitting.

FIG. 25 depicts a short length shoulder screw 192, in which an unhardened hex head 194 is formed on an end cap 196 as well as a lube fitting socket 198, in which a reduced diameter thread 200 is ground into the pin body 202.

Figure 26:
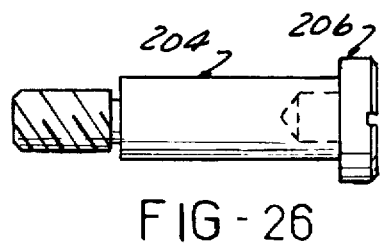
FIG. 26 is a side elevational view of a pin-based part which comprises a long length shoulder screw with a slotted head.

A longer length shoulder screw 204 is shown in FIG. 26, with a slotted head end cap 206.

Figure 27:
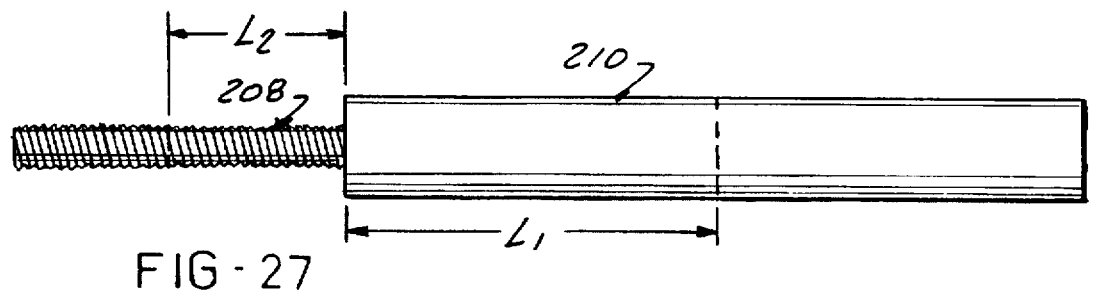
FIG. 27 is a side elevational view of a pin blank with a threaded stud portion.
Figure 28:
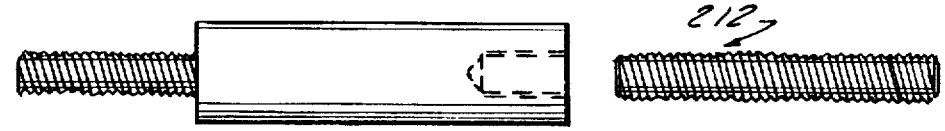
FIG. 28 is an exploded view of cut-to-length pin with a stud on one end cut to length and a stud detail to be assembled in the other end.
Figure 29:
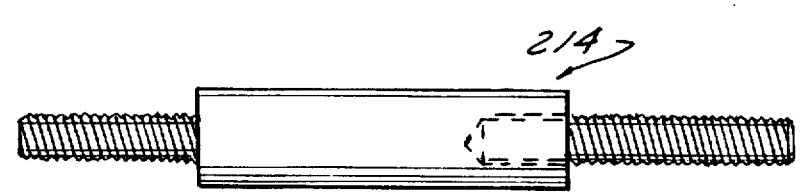
FIG. 29 is a side elevational view of the completed pin with two studs.

FIGS. 27–29 show a further development in which a long length threaded stud 208 is formed on a long length hardened and ground pin blank 210. The pin blank 210 is cut to a desired length $L_1$, while thread stud 208 is cut to length $L_2$.

A threaded section 212 is then installed in the opposite end to create a double threaded pin 214 (FIG. 29).

In practice, it becomes feasible to inventory a complete stock of a range of hardened and ground pin blank diameters, a stock of unhardened or medium-hardened pin blanks, and an assortment of unhardened end cap sizes and configurations, from which all of the pin sizes and types can be quickly assembled at low cost.

We claim:

1. A method of manufacturing an assortment of parts having pin sections of various diameter and length, and features of various configurations, sizes, and locations at one or both ends of said pin sections, comprising the steps of:
   manufacturing a quantity of pin blanks of each diameter of a length encompassing the range of lengths of said pin sections of said parts;
   maintaining an inventory of said pin blanks;
   hardening said pin blanks by heat treating;
   grinding said pin blanks to a finished diameter;
   manufacturing an assortment of end caps corresponding to each end feature of each configuration, size, and location for each part in said assortment; and
   cutting a pin blank to a required length and assembling an end cap having a required size and feature to the cutoff pin blank to form a part.

2. The method according to claim 1 wherein at least some of said pin blanks are hardened and ground before being placed in inventory.

3. The method according to claim 1 wherein each of said end caps is formed with a stud portion and in said assembling step, an axial bore is machined into a respective end of said cutoff pin blank and said stud portion of said end cap is fit into said axial bore.

4. The method according to claim 3 wherein in said assembling step, said stud portion forms a light interference fit in said axial bore.

5. The method according to claim 4 wherein in said assembling step, a seize compound is applied to said stud portion to cause said stud portion to be seized in said bore to be affixed thereto.

6. The method according to claim 5 wherein in said assembling step, TRIB-GEL compound is applied to said stud portion.

7. The method according to claim 1 wherein said step of manufacturing an assortment of end caps comprises manufacturing the end caps to have a head feature, cotter pin hole feature, keeper slot feature, snap ring feature, groove feature, flat feature, or any combination thereof.

* * * * *